Patented Nov. 9, 1943

2,333,989

UNITED STATES PATENT OFFICE 2,333,989

WELDING COMPOSITION

George G. Diem, Lock Haven, Pa.

No Drawing. Application May 14, 1942,
Serial No. 442,996

2 Claims. (Cl. 148—24)

This invention relates to a welding composition for use in welding white metal.

White metal, such as pewter, Babbitt metal, and the like, as is well known, comprises lead or tin as a base alloyed with antimony or copper; and is widely used for the formation of machine bearings and for many other uses.

Heretofore no satisfactory composition for use in the welding of white metal has been known and as a consequence broken parts of white metal, such as split or broken bearings, have been discarded to scrap as beyond repair.

Now in accordance with this invention there is provided a welding composition which enables split or broken parts of white metal to be readily welded by any metal welding process, as oxy-acetylene welding, electric welding, and the like, without injury, as by burning, to the welded parts and with the formation of a weld which will be as strong as the original metal and on breaking will show the same grain as the original metal.

The welding composition according to this invention may be readily formed into a rod to facilitate its use in welding and will have about the same melting point as the metal to be welded, thus insuring that it will fuse at about the same temperature as the metal to be welded, with avoidance of injury to the metal from overheating.

Generally speaking the welding composition according to this invention comprises an alloy of tin, zinc and aluminum in certain proportions, the alloy containing a wax, as white paraffine, beeswax, petroleum wax, or the like, and stearic acid, which together act to purify the alloy, when the components are melted together, by causing impurities to rise as a slag and provide a self-contained flux operative in the welding operation.

As more specifically illustrative of the welding composition according to this invention the composition will be made up on the following formula:

| | Per cent by weight |
|---|---|
| Tin | About 60.6 |
| Zinc | About 34.8 |
| Aluminum | About 1.5 |
| Wax (as white paraffine) | About 1.5 |
| Stearic acid | About 1.5 |

In making up the composition, one may proceed by first melting the aluminum at a temperature of 1150° F.–1200° F., then cooling to 975° F.–1025° F. and thereupon adding the zinc. Then further cooling to 800° F.–850° F. and adding the tin. Then cooling to 650° F.–700° F. and adding the stearic acid and wax. The composition is then poured into forms or moulds and cooled.

Alternatively, in making up the composition, the tin may be first melted at say 800° F.–850° F., then the temperature raised to 975° F.–1025° F., when the zinc is added, then the temperature further raised to 1150° F.–1200° F., when the aluminum is added. The composition may then be cooled down to 650° F.–700° F. when the stearic acid and wax is added after which the composition is poured into forms or moulds and cooled.

The final composition, for example, in the form of a welding rod will melt at about 580° F.–650° F. in the welding operation.

As has been indicated, the wax and stearic acid will cause impurities, such, for example, as may be in the tin, to rise to the surface of the melt so that they may be skimmed off. After skimming off the impurities the composition may be cast into rods of a convenient size for use in welding.

In use of the composition for welding white metal, as, for example, in the welding of split or broken bearings, the composition, in the form of a rod, will be used in the usual manner of any welding rod in connection with oxy-acetylene welding, electric welding, or the like welding process.

It will be noted that in connection with the use of welding composition according to this invention necessary flux is provided by the wax and stearic acid included in the composition, it being only necessary, in proceeding, to have the parts clean. Further, it will be noted that by virtue of the proportions of the several metallic components of the composition, it will have a melting point nicely adjusted to that of white metal, as Babbitt metal, for efficient welding without overheating of the white metal.

What I claim and desire to protect by Letters Patent is:

1. A welding composition for the welding of white metals comprising tin about 60.6% by weight, zinc about 34.8% by weight, aluminum about 1.5% by weight, wax about 1.5% by weight, and stearic acid about 1.5% by weight.

2. A welding composition for the welding of white metals comprising block tin about 60.6% by weight, zinc about 34.8% by weight, aluminum about 1.5% by weight, paraffine about 1.5% by weight, and stearic acid about 1.5% by weight.

GEORGE G. DIEM.